US008571750B2

(12) United States Patent
Bertosa et al.

(10) Patent No.: US 8,571,750 B2

(45) Date of Patent: Oct. 29, 2013

(54) DIAGNOSTIC TOOL WITH ADVANCED DIAGNOSTIC CAPABILITIES

(75) Inventors: Thomas J. Bertosa, Chardon, OH (US); Hamid Namaky, South Russell, OH (US); Michael Gessner, Akron, OH (US)

(73) Assignee: Service Solutions U.S. LLC, Warren, MI (US)

( * ) Notice: Subject to any disclaimer, the term of this patent is extended or adjusted under 35 U.S.C. 154(b) by 348 days.

(21) Appl. No.: 12/891,333

(22) Filed: Sep. 27, 2010

(65) Prior Publication Data

US 2011/0015823 A1 Jan. 20, 2011

Related U.S. Application Data

(63) Continuation of application No. 11/730,832, filed on Apr. 4, 2007, now Pat. No. 7,809,482.

(51) Int. Cl.
*G01M 17/00* (2006.01)

(52) U.S. Cl.
USPC .......................................... 701/31.2; 701/31.4

(58) Field of Classification Search
USPC ........... 701/29.7, 29.9, 31.4, 34.4, 29.1–29.4, 701/33.2, 33.4; 702/182–185, 187–188
See application file for complete search history.

(56) References Cited

U.S. PATENT DOCUMENTS

| | | | | |
|---|---|---|---|---|
| 6,526,340 | B1 | 2/2003 | Reul et al. | |
| 6,701,233 | B2 | 3/2004 | Namaky et al. | |
| 7,069,125 | B2 | 6/2006 | Namaky et al. | |
| 2002/0018066 | A1* | 2/2002 | Vizer | 345/428 |
| 2004/0054451 | A1* | 3/2004 | Murray et al. | 701/29 |
| 2005/0068174 | A1* | 3/2005 | Oesterling et al. | 340/539.24 |
| 2005/0256614 | A1* | 11/2005 | Habermas | 701/1 |
| 2011/0224866 | A1* | 9/2011 | Chen | 701/33 |

* cited by examiner

*Primary Examiner* — Yonel Beaulieu

(74) *Attorney, Agent, or Firm* — Baker & Hostetler LLP

(57) ABSTRACT

A diagnostic tool for a vehicle, includes a signal translator communicating with the vehicle in at least one protocol, an input unit for inputting information, a processor controlling a software according to the input information and communication with the vehicle, the processor controlling a recording of diagnostic data of the vehicle through the signal translator, a memory storing a software including a database controlled by the processor, the memory storing baseline data of the vehicle and recorded diagnostic data in the database, the processor comparing the stored baseline data and recorded diagnostic data, and a display unit displaying information according to the comparison between the stored baseline data and recorded diagnostic data. The comparison can also be made on a separate computer storing the baseline data and receiving the recorded data from the diagnostic tool.

18 Claims, 6 Drawing Sheets

DIAGNOSTIC TOOL WITH ADVANCED DIAGNOSTIC CAPABILITIES

CROSS-REFERENCE TO RELATED APPLICATIONS

This application claims priority to and is a continuation application, of U.S. patent application entitled, Diagnostic Tool with Advanced Diagnostic Capabilities, filed Apr. 4, 2007, having Ser. No. 11/730,832 issued on Oct. 5, 2010 as U.S. Pat. No. 7,809,482, the disclosure of which is hereby incorporated by reference in its entirety.

FIELD OF THE INVENTION

The present invention relates generally to an automotive diagnostic tool. More particularly, the present invention relates to an automotive diagnostic tool having advanced capabilities to detect problems with a vehicle when a diagnostic trouble code has not been set.

BACKGROUND OF THE INVENTION

Onboard control computers have become prevalent in motor vehicles, but as safety, economy, and emissions requirements have continued to escalate, friction braking systems, and traction control devices have proven below the requirements set out in government regulations and the implicit demands of competitors' achievements. Successive generations of onboard control computers have acquired increasing data sensing and retention capability as the electronics have advanced.

Present external diagnostic and display apparatus, known as diagnostic tools, are commonly limited to reporting the data acquired by the onboard control computer itself. Increasingly, subtle subsystem failures in vehicles overload the ability of maintenance technicians, not simply to read the faults detected and stored by the diagnostic tools themselves, but to combine those readings with peripheral measurements and deduce corrective actions with both speed and accuracy.

Currently in the automotive industry, there are both stand alone and hand-held diagnostic testers or tools used in connection with motor vehicle maintenance and repair. For example, hand-held diagnostic tools have been used to trouble-shoot faults associated with vehicular control units. Diagnostic tools detect faults based on Diagnostic Trouble Codes or DTCs that are set in the vehicle's onboard computer. A DTC can be triggered and stored when there is a problem with the vehicle. A technician then retrieves the DTC using a diagnostic tool, repairs the associated problem and then deletes the DTC from the vehicle's computer.

However, problems in diagnosing the cause of failure in a vehicle can occur with a vehicle where a DTC is not set. In this instance, a technician is left to his or her own expertise to troubleshoot the problem. There can be an instance when the vehicles have drivability problems and no DTCs are stored in the vehicle's computers. Diagnosing the problem is difficult for the technician when no DTC is stored in the vehicle's computer. The technician then must use inefficient measures of using technical service bulletins (i.e., TSB's), diagnose based on symptoms charts, talking with others with regard to the problem, or merely guessing.

Accordingly, it is desirable to provide a method and apparatus that will allow a technician to use a diagnostic tool to determine the nature of a problem where no DTCs have been triggered.

SUMMARY OF THE INVENTION

The foregoing needs are met, to a great extent, by the present invention, wherein in one aspect an apparatus is provided that in some embodiments a technique and apparatus that will allow a technician to use a diagnostic tool to determine the nature of a problem where no DTCs have been triggered.

In accordance with one embodiment of the present invention, a diagnostic tool for a vehicle, includes a signal translator communicating with the vehicle in at least one protocol, an input unit for inputting information, a processor controlling a software according to the input information and communication with the vehicle, the processor controlling a recording of diagnostic data of the vehicle through the signal translator, a memory storing a software including a database controlled by the processor, the memory storing baseline data of the vehicle and recorded diagnostic data in the database, the processor comparing the stored baseline data and recorded diagnostic data, and a display unit displaying information according to the comparison between the stored baseline data and recorded diagnostic data. The present invention can also include selecting a tolerance for the comparison of the data.

In accordance with another embodiment of the present invention, a system for a diagnostic tool for a vehicle, includes a first unit for communicating with the vehicle in at least one protocol, a second unit for inputting information, a processor controlling a software according to the input information and communication with the vehicle, the processor controlling a recording of diagnostic data of the vehicle through the first unit, a memory storing a software including a database controlled by the processor, the memory storing recorded diagnostic data in the database. The recorded data being transferred to a personal computer, to where there is stored base line diagnostic data of a corresponding vehicle. The separate personal computer can launch a software application for comparing the stored baseline data and recorded diagnostic data. The personal computer can display information according to the comparison between the stored baseline data and recorded diagnostic data. A tolerance can also be entered into the personal computer for the comparison.

In accordance with yet another aspect of the present invention, a method of operating a diagnostic tool for a vehicle, includes linking the diagnostic tool with a diagnostic computer of the vehicle through the data link connector of the vehicle, communicating with the diagnostic computer of the vehicle in a communication protocol, selecting among a plurality of parameters for recording, recording diagnostic information of the vehicle by the diagnostic tool according to the selected parameters, accessing a database of stored baseline data, comparing between the recorded diagnostic information and the stored baseline data, and displaying the difference in the comparison between the recorded diagnostic information and the stored baseline data. The comparison and the display of the comparison can be either on the diagnostic tool or on a separate computer receiving the recorded diagnostic information and storing the baseline data.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
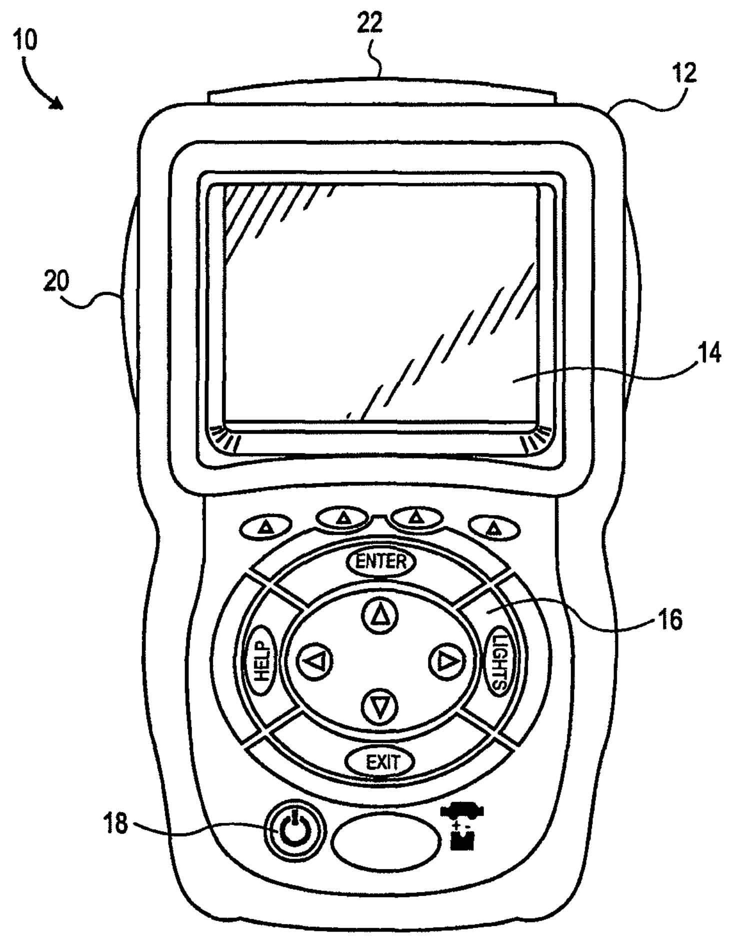
FIG. 1 is a front view illustrating a diagnostic tool according to an embodiment of the invention.

The invention will now be described with reference to the drawing figures, in which like reference numerals refer to like parts throughout. An embodiment in accordance with the present invention provides an apparatus and method that will allow a user, such as a technician, to use a diagnostic tool to determine the nature of a problem, where no DTCs have been triggered.

Manufacturers have programmed their vehicle onboard computers with complicated methods of detecting a variety of problems. Further, the United States Environmental Protection Agency has mandated that DTCs be set where there are emissions related problems with the vehicle using the Onboard Diagnostic II System, also known as the OBD II system.

However, there are still problems that occur with a vehicle, where no DTC will ever be set. Thus, a technician will have to determine the nature of the problem without the assistance of a DTC. This can be done through evaluating the symptoms, reviewing technical service bulletins or through intuition. These methods can be time consuming and ineffective, and frustrating to both the technician and the vehicle owner.

In an embodiment of the present invention, a technician is able to record diagnostic parameters of the vehicle in operation and discern the problem by having the diagnostic tool compare the actual parameters with a library of existing parameters. The actual parameters have been, for example, measured or determined by using the diagnostic or scan tool. On the other hand, the library of existing parameters, are gathered under normal operating conditions, thus including a set of baseline recordings. By comparing the actual determined parameters with existing parameters, such as the baseline recordings, the diagnostic tool is able to alert the technician of any anomalies. It should be noted that recording and comparing parameters include the ability to record and compare waveforms, and various other forms of measurements.

The library of recordings of normal operating conditions can be generated in a variety of ways. First, a user or manufacturer can store a library of parameters onto the diagnostic tool, derived from recordings made from various vehicles under normal conditions. The recordings made under the normal conditions would include the baseline recordings that are used for the comparison. In addition, the technician can make recordings of vehicles and store them in the library of the diagnostic tool. Further, the technician can connect the diagnostic tool to the Internet and find additional recordings to compare the actual recording.

When comparing between actual parameters and normal parameters, the user, such as the technician, can instruct the tool to alert the user of anomalies, only if the actual range is beyond a specific percent of the normal. In other words, the user can set a tolerance level for the comparison of the actual measurements with normal operating parameters in the baseline recordings.

An embodiment of the present inventive apparatus is illustrated in FIG. 1. In particular, FIG. 1 is a front view illustrating a diagnostic tool 10 according to an embodiment of the invention. The diagnostic tool 10 can be any computing device, for example, the NEMISYS diagnostic tool from SERVICE SOLUTIONS (part of the SPX Corporation). The diagnostic tool 10 includes a housing 12 to encase the various components of the diagnostic tool 10, such as a display 14, a user interface 16, a power button 18, a memory card reader 20 and a connector interface 22. The display 14 can be any type display, including for example but not limited to, a liquid crystal display (LCD), organic light emitting diode (OLED), field emission display (FED), electroluminescent display (ELD), etc. In addition, the LCD, for example, can be touch screen that both displays and performs the additional task of interfacing between the user and the diagnostic tool 10. The user interface 16 allows the user to interact with the diagnostic tool 10, in order to operate the diagnostic tool as the user prefers. The user interface 16 can include function keys, arrow keys or any other type of keys that can manipulate the diagnostic tool 10 in order to operate the diagnostic tool through the software. The user interface or input device 16 can also be a mouse or any other suitable input device for the user interface 16, including a keypad, touchpad, etc. The user interface 16 can also include keys correlating to numbers or alphanumeric characters. Moreover, as mentioned above, when the display 14 is touch sensitive, the display 14 can supplement or even substitute for the user interface 16. The power key or button 18 allows the user to turn the power to the diagnostic tool 10 on and off, as required.

A memory card reader 20 can be a single type card reader, such as, but not limited to, a compact flash card, floppy disk, memory stick, secure digital, flash memory or other type of memory. The memory card reader 20 can be a reader that reads more than one of the aforementioned memory such as a combination memory card reader. Additionally, the card reader 20 can also read any other computer readable medium, such as CD (compact disc), DVD (digital video or versatile disc), etc.

The connector interface 22 allows the diagnostic tool 10 to connect to an external device, such as, but not limited to, an ECU (electronic control unit) of a vehicle, a computing device, an external communication device (such as a modem), a network, etc. through a wired or wireless connection. Connector interface 22 can also include connections such as a USB (universal serial bus), FIREWIRE (Institute of Electrical and Electronics Engineers (IEEE) 1394), modem, RS232, RS48J, and other connections to communicate with external devices, such as a hard drive, USB drive, CD player, DVD player, or other computer readable medium devices.

Figure 2:
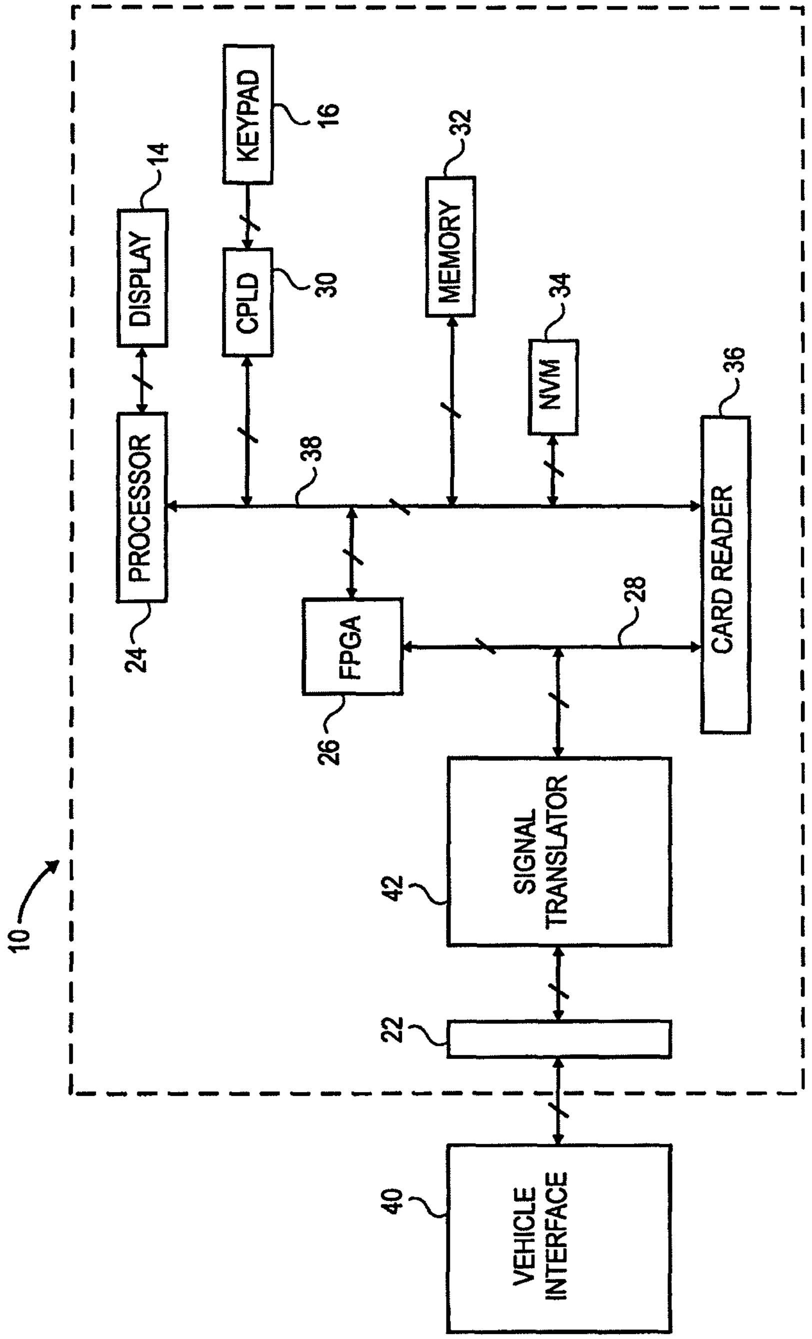
FIG. 2 is a block diagram of the components of a diagnostic tool.

FIG. 2 is a block diagram of the components of a diagnostic tool 10. In FIG. 2, the diagnostic tool 10, according to an embodiment of the invention, includes a processor 24, a field programmable gate array (FPGA) 26, a first system bus 28, the display 14, a complex programmable logic device (CPLD) 30, the user interface 16 in the form of a keypad, a memory subsystem 32, an internal non-volatile memory (NVM) 34, a card reader 36, a second system bus 38, the connector interface 22, and a selectable signal translator 42. A vehicle communication interface 40 is in communication with the diagnostic tool 10 through connector interface 22 via an external cable. The connection between the vehicle communication interface 40 and the connector interface 22 can also be a wireless connection such as BLUETOOTH, infrared device, wireless fidelity (WiFi, e.g. 802.11), etc.

The selectable signal translator 42 communicates with the vehicle communication interface 40 through the connector interface 22. The signal translator 42 conditions signals received from a motor vehicle control unit through the vehicle communication interface 40 to a conditioned signal compatible with the diagnostic tool 10. The translator 42 can communicate with, for example, the communication protocols of J1850 signal, ISO 9141-2 signal, communication collision detection (CCD) (e.g., Chrysler collision detection), data communication links (DCL), serial communication interface (SCI), S/F codes, a solenoid drive, J1708, RS232, controller area network (CAN), or other communication protocols that are implemented in a vehicle.

The circuitry to translate a particular communication protocol can be selected by the FPGA 26 (e.g., by tri-stating unused transceivers) or by providing a keying device that plugs into the connector interface 22 that is provided by diagnostic tool 10 to connect diagnostic tool 10 to vehicle communication interface 40. Translator 42 is also coupled to FPGA 26 and the card reader 36 via the first system bus 28. FPGA 26 transmits to and receives signals (i.e., messages) from the motor vehicle control unit through the translator 42.

FPGA 26 is coupled to the processor 24 through various address, data and control lines by the second system bus 38. FPGA 26 is also coupled to the card reader 36 through the first system bus 28. Processor 24 is also coupled to the display 14 in order to output the desired information to the user. The processor 24 communicates with the CPLD 30 through the second system bus 38. Additionally, the processor 24 is programmed to receive input from the user through the user interface 16 via the CPLD 30. The CPLD 30 provides logic for decoding various inputs from the user of diagnostic tool 10 and also provides the glue-logic for various other interfacing tasks.

Memory subsystem 32 and internal non-volatile memory 34 are coupled to the second system bus 38, which allows for communication with the processor 24 and FPGA 26. Memory subsystem 32 can include an application dependent amount of dynamic random access memory (DRAM), a hard drive, and/or read only memory (ROM). Software to run the diagnostic tool 10 can be stored in the memory subsystem 32. The internal non-volatile memory 34 can be, but not limited to, an electrically erasable programmable read-only memory (EEPROM), flash ROM, or other similar memory. The internal non-volatile memory 34 can provide, for example, storage for boot code, self-diagnostics, various drivers and space for FPGA images, if desired. If less than all of the modules are implemented in FPGA 26, the non-volatile memory 34 can contain downloadable images so that FPGA 26 can be reconfigured for a different group of communication protocols.

Figure 3:
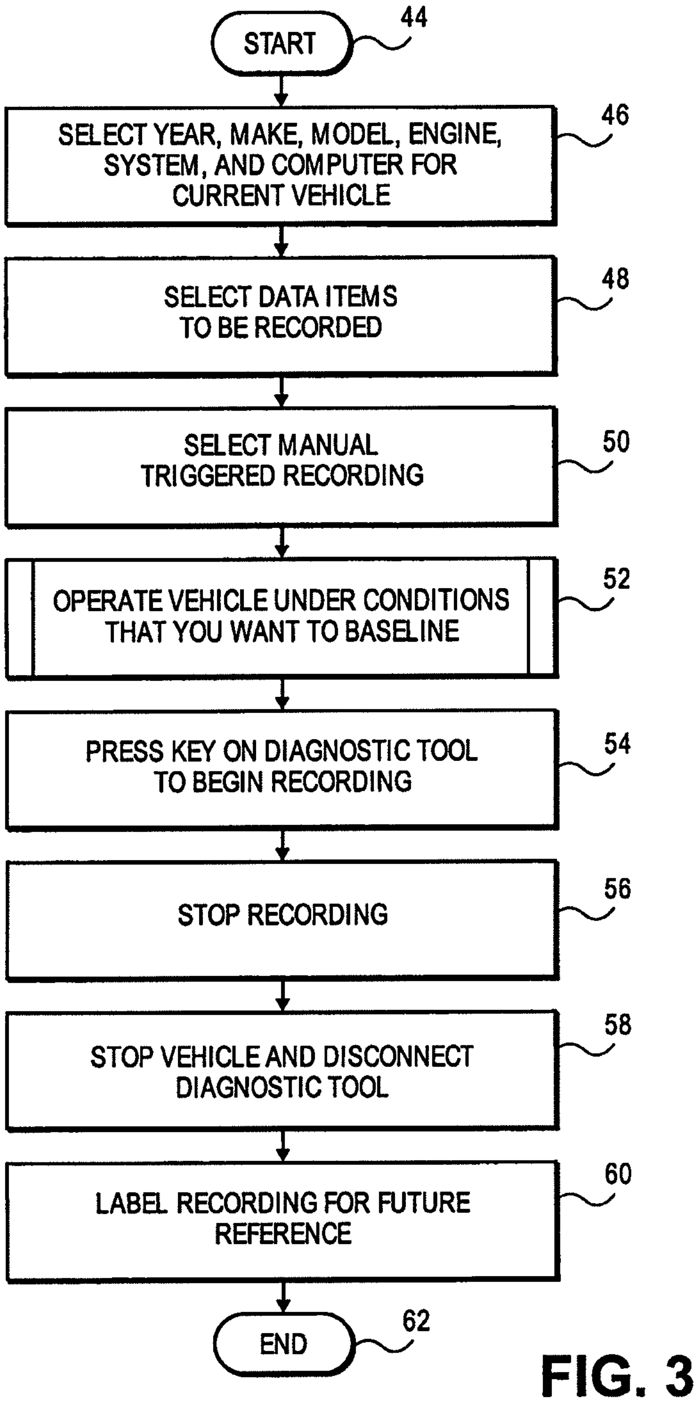
FIG. 3 is a flowchart illustrating steps that can be followed in accordance with one embodiment of the method or process.

FIG. 3 is a flowchart illustrating steps that can be followed in accordance with one embodiment of the technique of the present invention. In particular, FIG. 3 illustrates the steps that can be followed for obtaining baseline recordings. At step 44, the diagnostic tool 10 is powered on and is connected to the vehicle's computer through the diagnostic link connector. Then, at step 46, the user selects pertinent information about the vehicle under the test, including for example the year, make, model, engine, system or computer for the current vehicle. Then, the user selects the data items the user wishes to record, at step 48.

Thereafter, at step 50, the user selects the recording function of the diagnostic tool 10. The selection of the recording can be manually performed or automatically according to a set of conditions. Next, at step 52, the user operates the vehicle under the conditions the user wishes to record. Then, at step 54, the user selects the recording function to begin recording. Once the user has recorded the time frame he or she wishes to record, the user will stop the recording at step 56. Then, the user will stop operating the vehicle at step 58 and disconnect the diagnostic tool 10 from the vehicle. At step 60, the user may label the recording with any appropriate title through the user interface 16 and power the diagnostic tool 10 off at step 62 through the power key 18. The order of the steps above is not limiting and at least one or more steps shown above can be omitted.

Figure 4:
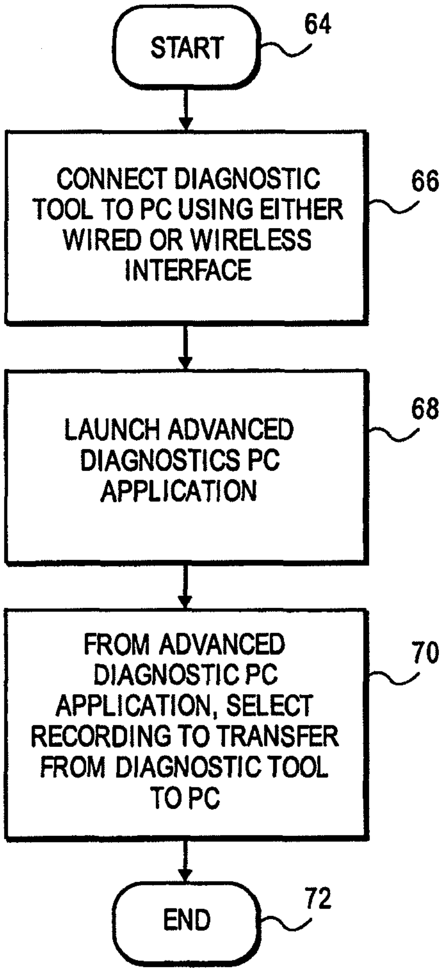
FIG. 4 is a flowchart illustrating steps that can be followed in accordance with another embodiment of the method or process.

FIG. 4 is a flowchart illustrating steps that can be followed in accordance with another embodiment of the technique of the present invention. In particular, FIG. 4 illustrates steps that can be followed in creating a database of baseline recordings. At step 64, the diagnostic tool 10 is powered on. Then, at step 66, the diagnostic tool 10 is connected to a personal computer (PC) or the like. The connection between the diagnostic tool 10 and personal computer can be using either a wired (e.g., universal serial bus, parallel data link, etc.) or wireless (e.g., Institute of Electrical and Electronics Engineers 802.11, BLUETOOTH, etc.) connector interface 22. In creating the database of baseline recordings, the database can be stored anywhere possible. For example, but not limited to, the database can be stored on a PC hard drive, on the Internet or on a local server.

Further, at step 68, the user initiates a diagnostic personal computer application on the PC, relating to the recording feature of the diagnostic tool 10. Then, at step 70, the user transfers the recordings from the diagnostic tool 10 to the PC. Finally, at step 72, the diagnostic tool 10 is powered off and disconnected from the PC.

Figure 5:
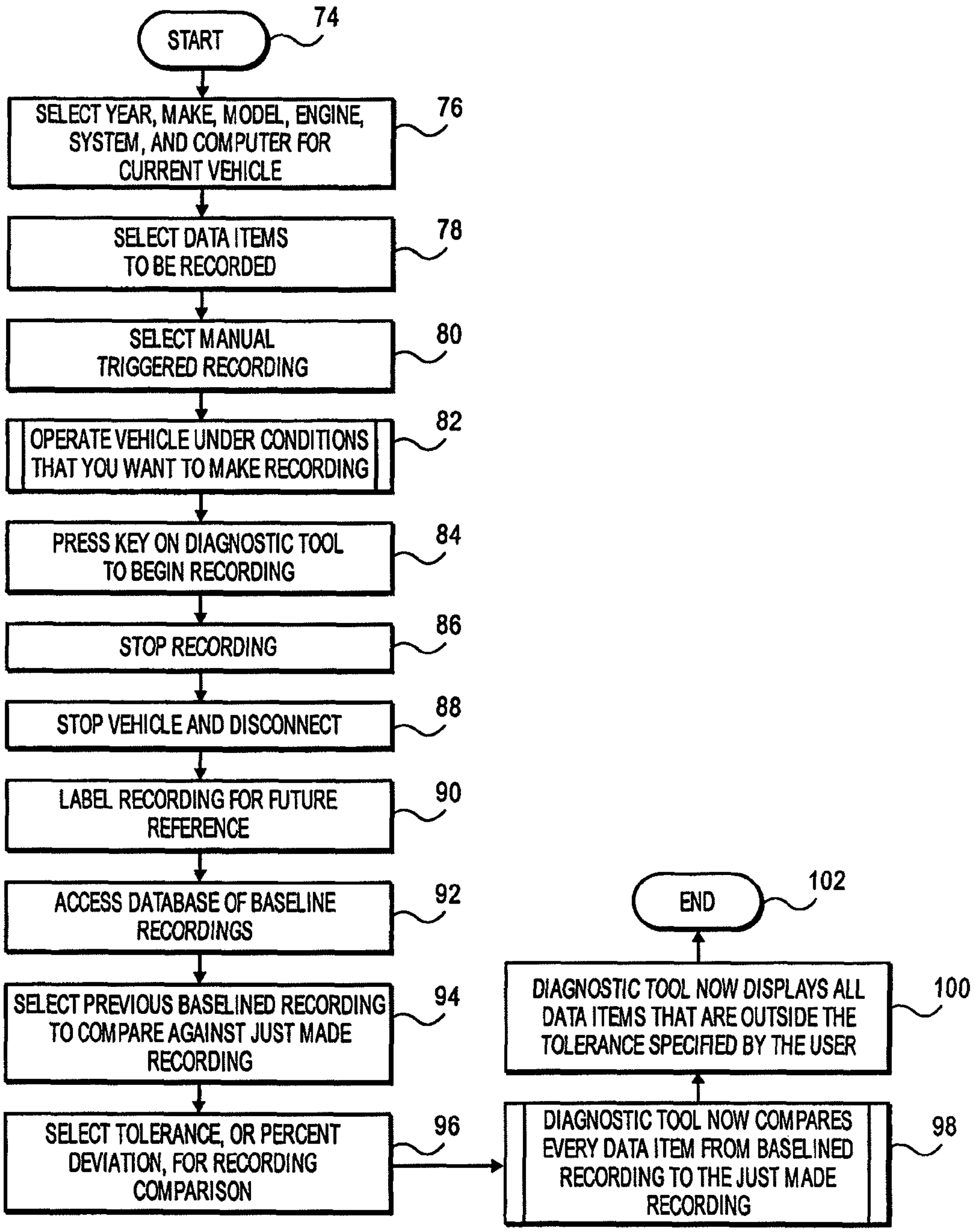
FIG. 5 is a flowchart illustrating steps that can be followed in accordance with still another embodiment of the method or process.

FIG. 5 is a flowchart illustrating steps that can be followed in accordance with still another embodiment of the method or process. In particular, FIG. 5 illustrates the steps that can be followed in comparing an actual recording with a baseline recording, directly on the diagnostic tool 10.

First, at step 74, the diagnostic tool 10 is powered on and connected to the vehicle under test. The diagnostic tool 10 is in communication with the vehicle's computer by way of the diagnostic link connector. Next, at step 76, the user selects pertinent information relating to the vehicle, as mentioned previously with regard to FIG. 3.

Then, the user selects the data items to record, at step 78. These data items can be freely selected or entered, or the data items appear on a menu. The sampling rate can depend on the data items or parameters selected. At step 80, the user initiates the recording function of the diagnostic tool 10, thereby manually triggering the recording. Alternatively, the recording can be triggered automatically through a preset or selected set of constraints. Thereafter, at step 82, the user operates the vehicle under the conditions under which he or she desires to record. At step 84, the user begins recording the measurements onto the diagnostic tool 10. Once the desired operating conditions have been achieved, the user can then stop the recording, at step 86 and stop operating the vehicle and disconnect the diagnostic tool 10 at step 88. The recording can also stop at a preset or user defined point. The recordings can be buffered in the memory 32 and backed up through the non-volatile memory unit 34.

At step 90, the user can label the recording through the user interface 16. Next, at step 92, the user can access a database of baseline recordings stored on the diagnostic tool 10. Then, at step 94, the user can select the particular baseline recording the user desires, in order to compare the actual recording to the baseline recording.

The diagnostic tool 10 can compare all diagnostic parameters across all frames recorded. The diagnostic tool will look at, for example but not limited to, how fast readings change, the RPM (revolutions per minute) change from a first gear to a second gear, battery voltage, TPS (throttle position sensor) or how the MAP/MAF (manifold pressure/mass airflow) sensor changes under heavy acceleration or other engine loads, etc.

The user can make his or her own baseline recording as long as the user has access to a known good vehicle. A known good vehicle can be defined, for example but not limited to, where the vehicle functions within a set standard and deviation within the standard. A further example would be where the vehicle as a whole including all its parts has a performance at or above a set standard. That is, the vehicle is performing the functions that it is designed to perform, within the design constraints, or at a predetermined level or higher. A known good vehicle can also be defined by the user. For example, if a user considers a vehicle to be performing well according to his or her own standards, then the baseline can be recorded of that vehicle.

The user can make recordings under the same operating conditions and environment as the vehicle that has the drivability problem. For example, at certain elevations and/or general climatic conditions, vehicles perform differently. Elevation has an effect on the wide-open-throttle (WOT) power of an engine. Since air gets thinner as elevation increases, the engine begins to suffer from a deprivation of air when the accelerator is depressed fully. Also, conditions such as high temperature, low barometric pressure, and high humidity all combine to reduce the engine power. Therefore, if the operating conditions and environment are matched or closely matched, a better resulting comparison is obtained. When the recordings are compared, the differences provide a cause to the vehicle's drivability problems.

Further, at step 96, the user can select a tolerance or percent deviation for the comparison. With such a selection, the diagnostic tool 10 will return data points or measurements only when a baseline and the actual recording deviate from each other by the selected tolerance. For example, if the user only wishes to know if the deviation between the actual recording and baseline recording is 10% or greater, the user can enter this tolerance level. Then, the diagnostic tool 10 will only return those points or instances where the deviation was 10% or greater. It should be noted that any such number can be selected for the selection of the deviation.

Thereafter, at step 98, the diagnostic tool 10 compares the actual recording to the baseline recording. Subsequently, based on the tolerance level selected, the diagnostic tool 10 can return data points or measurements that are outside the tolerance level. At step 100, the diagnostic tool 10 displays through display 14, all the data items that are outside the tolerance specified by the user. Based on these results, the user can readily determine the problems associated with the vehicle, even though a diagnostic trouble code has not been set in the vehicle or will ever be set. Lastly, at step 102, the diagnostic tool 10 can be powered off.

Figure 6:
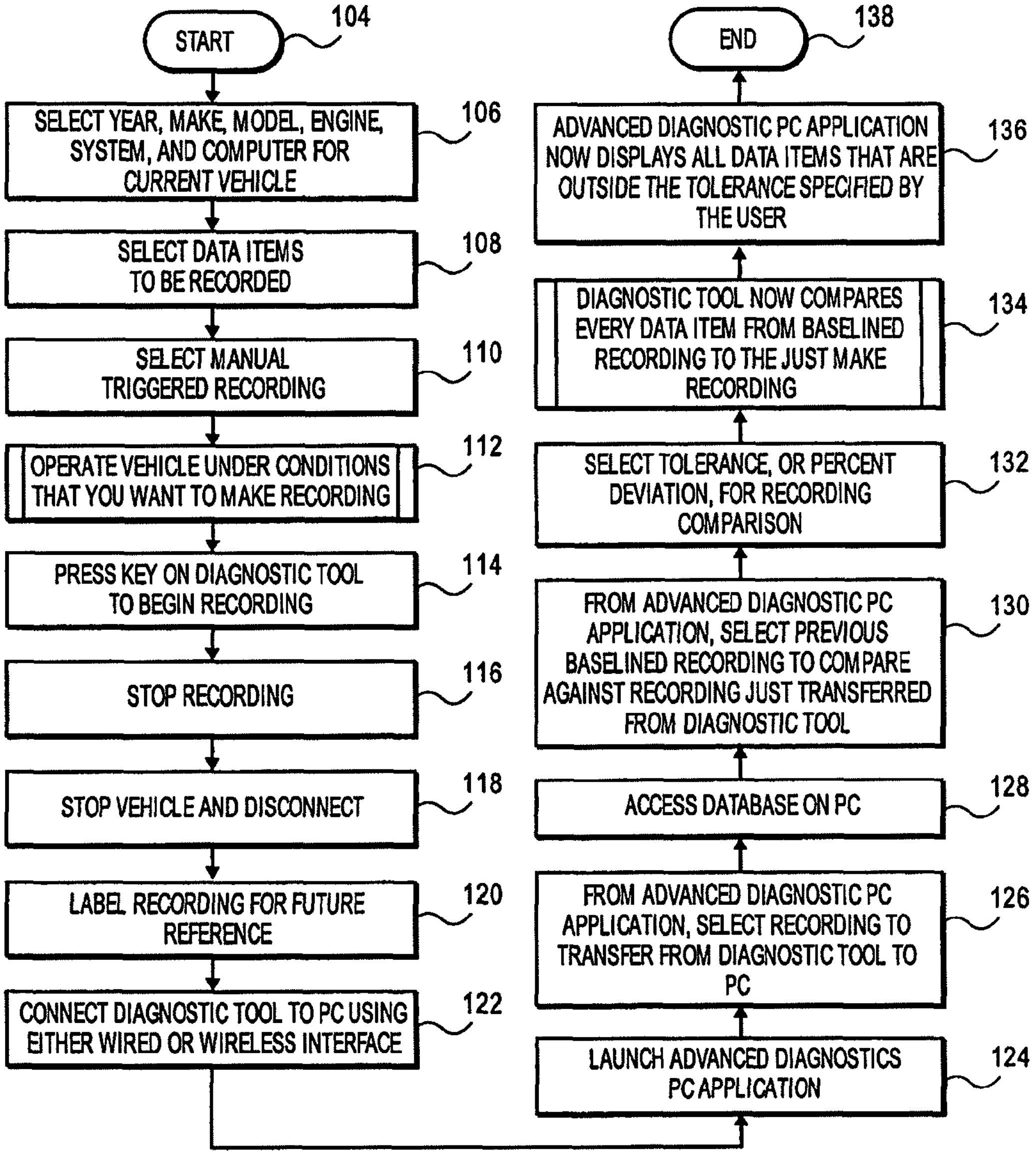
FIG. 6 is a flowchart illustrating steps that can be followed in accordance with yet another embodiment of the method or process.

FIG. 6 is a flowchart illustrating steps that may be followed in accordance with yet another embodiment of the method or process. In particular, FIG. 6 illustrates a variation of the methodology of FIG. 5. Specifically, FIG. 6 allows a PC to compare the actual recording to the baseline recording, rather than have the diagnostic tool 10 perform the comparison. Thus, steps 104 through 120 of FIG. 6 are substantially similar to steps 74 through 90 of FIG. 5 and shall not be repeated here.

At step 122, the user can connect the diagnostic tool 10 to a PC, using a wired or wireless connection, as needed or desired. Thereafter, at step 124, the user initiates the advanced diagnostic PC application. Then, at step 126, the user transfers the recordings from the diagnostic tool 10 to the PC, by selecting the recording to be transferred. Next, at step 128, the user accesses a database of baseline recordings, just stored or previously stored for later comparison, through the PC. After accessing the database, there is a selection of the previous baseline recording to compare against the recording just transferred from the diagnostic tool 10 from the advanced diagnostic PC application (step 130). The tolerance or percent deviation is selected for the recording comparison (step 132). The diagnostic tool now compares every data item from the baseline recording to the present recording (step 134). The advanced diagnostic PC application displays all of the data items that are outside of the tolerance (step 136). The tolerance can be selected by the user or predetermined through a set of variables. Based on these results, the problems associated with the vehicle can be determined, even though a diagnostic trouble code has not been set in the vehicle. Finally, the diagnostic tool 10 can be powered off (step 138). The order of the steps above is not limiting and at least one or more steps shown above can be omitted or additional steps can be included.

As seen from the above description, the present diagnostic tool 10 can store a known good baseline of data in memory and have the ability to compare the good baseline data against measured data of the vehicle in question by the diagnostic tool 10, to help diagnose for example a drivability problem. Further the present diagnostic tool 10 can retrieve a known good baseline data from another location and have the ability to compare the good baseline data against another data set measured by the diagnostic tool 10, to help diagnose a drivability problem.

The present invention can be realized as computer-executable instructions in computer-readable media. The computer-readable media includes all possible kinds of media in which computer-readable data is stored or included or can include any type of data that can be read by a computer or a processing unit. The computer-readable media include for example and not limited to storing media, such as magnetic storing media (e.g., ROMs, floppy disks, hard disk, and the like), optical reading media (e.g., CD-ROMs (compact disc-read-only memory), DVDs (digital versatile discs), re-writable versions of the optical discs, and the like), hybrid magnetic optical disks, organic disks, system memory (read-only memory, random access memory), non-volatile memory such as flash memory or any other volatile or non-volatile memory, other semiconductor media, electronic media, electromagnetic media, infrared, and other communication media such as carrier waves (e.g., transmission via the Internet or another computer). Communication media generally embodies computer-readable instructions, data structures, program modules or other data in a modulated signal such as the carrier waves or other transportable mechanism including any information delivery media. Computer-readable media such as communication media may include wireless media such as radio frequency, infrared microwaves, and wired media such as a wired network. Also, the computer-readable media can store and execute computer-readable codes that are distributed in computers connected via a network. The computer readable medium also includes cooperating or interconnected computer readable media that are in the processing system or are distributed among multiple processing systems that may be local or remote to the processing system. The present invention can include the computer-readable medium having stored thereon a data structure including a plurality of fields containing data representing the techniques of the present invention.

An example of a computer, but not limited to this example of the computer, that can read computer readable media that includes computer-executable instructions of the present invention includes a processor that controls the computer. The processor uses the system memory and a computer readable memory device that includes certain computer readable recording media. A system bus connects the processor to a network interface, modem or other interface that accommodates a connection to another computer or network such as the Internet. The system bus may also include an input and output interface that accommodates connection to a variety of other devices.

Although an example of the diagnostic tool is shown using a separate personal computer, it will be appreciated that other techniques for comparison of the data can be used. Also, although the diagnostic tool is useful to diagnose a vehicle when no DTC is set, it can also be used diagnose other types of apparatus where diagnostic information can be obtained and recorded, including for example but not limited to, apparatus such as video devices, audio devices, communication devices, etc.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method of checking a system of a vehicle comprising:
- inputting vehicle information into a computer system;
- inputting measured vehicle performance information into the computer system;
- accessing a database containing baseline performance information for a vehicle corresponding to the inputted measured vehicle information;
- comparing the inputted measured vehicle performance information with the baseline performance information;
- indicating differences between the inputted measured vehicle performance information with the baseline performance information; and
- selecting a tolerance to allow for tolerance differences between the measured vehicle performance information and the baseline performance information before indicating differences between the inputted measured vehicle performance information and the baseline performance information.

2. The method of claim 1, wherein the computer system includes a personal computer (pc).

3. The method of claim 1, wherein the computer system includes a portable hand held tool.

4. The method of claim 1, wherein the inputting the measured vehicle performance information includes: operatively connecting the computer system to vehicle, operating the vehicle, starting recording the vehicle performance information, stopping recording the vehicle performance information, and saving the vehicle performance information.

5. The method of claim 1, further comprising putting data in the database by at least one of the following ways: downloading previously recorded data from a remote source, and inputting the data into the database by connecting the database to a vehicle computer and operating a vehicle believed to be operating correctly.

6. The method of claim 1, further comprising selecting a performance parameter as a data item to be recorded and compared.

7. A diagnostic system, comprising:
- a memory; and
- a microprocessor, wherein the diagnostic system is configured to accomplish a method of checking a system of a vehicle including,
- inputting vehicle information into a computer system,
- inputting measured vehicle performance information into the computer system,
- accessing a database having baseline performance information for a vehicle corresponding to the inputted vehicle information,
- comparing the inputted measured vehicle performance information with the baseline performance information,
- indicating differences between the inputted measured vehicle performance information and the baseline performance information, and
- selecting a tolerance to allow for tolerance differences between the measured vehicle performance information and the baseline performance information before indicating differences between the inputted measured vehicle performance information and the baseline performance information.

8. The system of claim 7, wherein the memory and microprocessor are contained in at least one of either a personal computer (pc) and a portable handheld tool.

9. A diagnostic device for a vehicle having a microprocessor and a memory, the microprocessor configured to perform a method comprising:
- linking the diagnostic device with a diagnostic computer of the vehicle through a data link connector of the vehicle;
- communicating with said diagnostic computer of the vehicle in a communication protocol;
- allowing a user to select among a plurality of parameters for recording;
- recording raw diagnostic data of the vehicle at predetermined conditions by said diagnostic device according to the selected parameters;
- accessing a database of stored baseline diagnostic data of a corresponding vehicle in a predetermined state;
- recording the baseline diagnostic data by said diagnostic device of the corresponding vehicle under the predetermined conditions, where the predetermined conditions include conditions affecting an operation of the vehicle, the baseline recording at the predetermined state being when the vehicle is operating in certain predetermined normal levels;

comparing between the raw recorded diagnostic data and the stored baseline diagnostic data at the predetermined conditions; and displaying the difference off the comparison between the raw recorded diagnostic data and the stored baseline diagnostic data.

10. The system of claim 9, wherein the method further comprises:

transferring the recorded raw diagnostic data to a personal computer for comparison with the stored base line diagnostic data of the vehicle.

11. The system of claim 9, wherein the method further comprises labeling the recorded raw diagnostic data through an input unit.

12. The system of claim 9, wherein the method further comprises manually initiating the recording of raw diagnostic data.

13. The system of claim 9, wherein the storing of baseline diagnostic data being on said diagnostic device and the comparison being made by the microprocessor of the diagnostic device.

14. The system of claim 9, wherein the method further comprises selecting a tolerance level for the comparison of the recorded raw diagnostic data and the baseline diagnostic data.

15. The system of claim 10, wherein the method further comprises comparing every data item from the recorded raw diagnostic data with the baseline diagnostic data.

16. The system of claim 9, wherein the method further comprises:

transferring the recorded raw diagnostic data to a separate computer; and launching a program on said computer to compare the recorded raw diagnostic data with the baseline diagnostic data of the corresponding vehicle.

17. The system of claim 9, wherein the method further comprises:

selecting a tolerance level for the comparison on a separate computer; and displaying on the computer all data items outside the selected tolerance.

18. The system of claim 9 wherein the system includes at least one of either a personal computer (pc) and a portable handheld tool.

* * * * *